Patented Nov. 30, 1926.

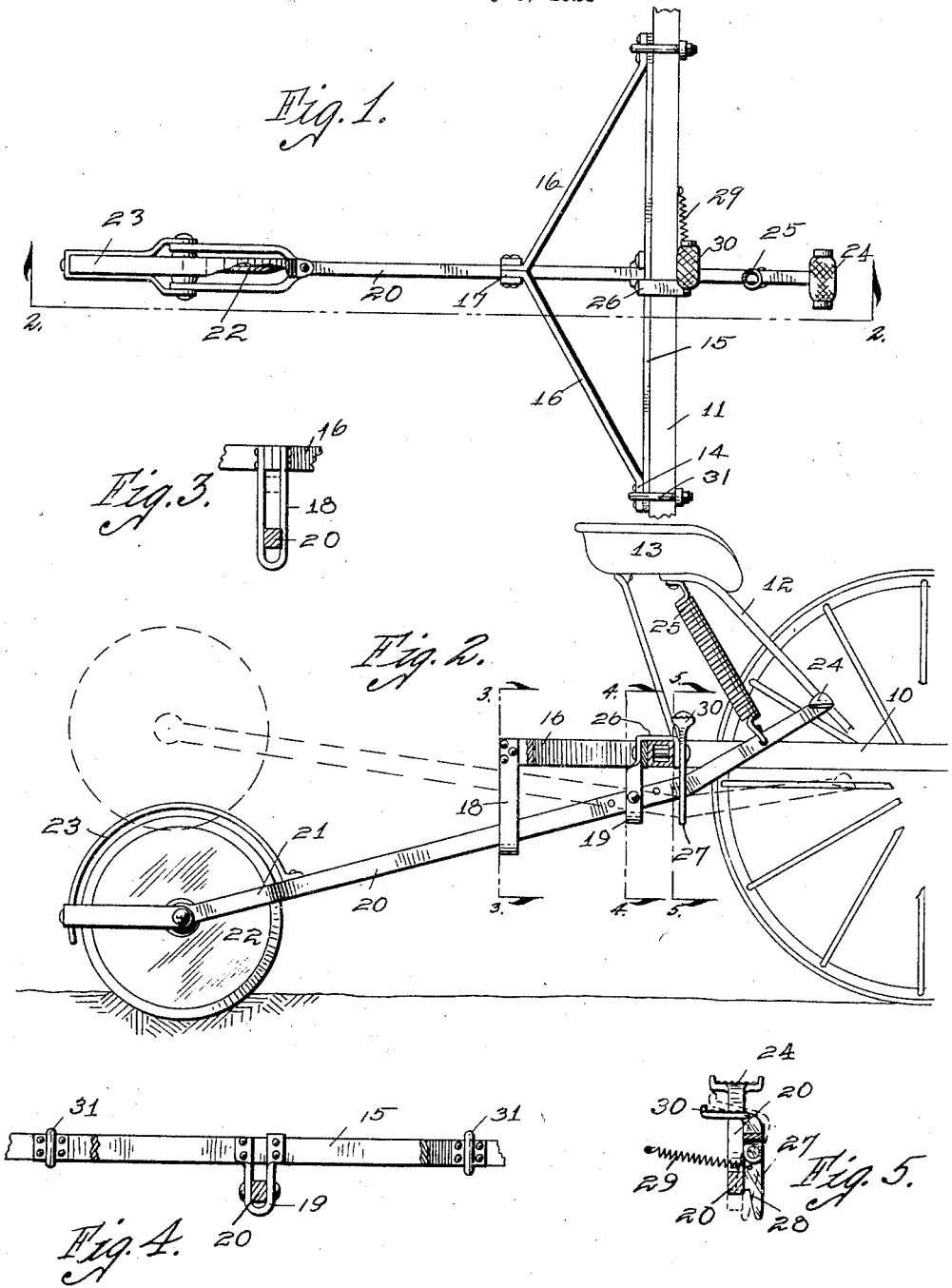

1,608,666

UNITED STATES PATENT OFFICE.

JOHN C. PLUM, OF MARSHALLTOWN, IOWA.

ATTACHMENT FOR CORN PLANTERS.

Application filed July 6, 1926. Serial No. 120,734.

This invention relates to an attachment designed to be used in connection with a corn planter.

Considerable difficulty has been experienced in the past in the operation of corn planters on side hills or inclined surfaces when the corn planter is being driven in parallel relation with the base of the inclined surface, due to the fact that the rear end of the corn planter has a tendency to work down hill by the action of gravity in the loose soil, the forward end of the corn planter being maintained in proper relation with the mark by being supported by the draft animals. In order to maintain the planter in proper relation with the guide mark, it has heretofore been necessary to keep the forward end of the planter tongue at one side of the planter mark. In actual operation this is very objectionable as it is considerably harder to drive straight rows under this condition.

It is the object of my invention to provide a device in the nature of an attachment which can be easily and quickly applied to a planter frame, and when applied will assist in maintaining the planter in proper relation with the guide marker when operated in side hills and inclined surfaces; and to provide in connection therewith means whereby the device may be thrown into and out of operative relation with the ground surface when not needed, as for instance, when planting on level surfaces or turning corners.

A further object is to provide in a corn planter attachment, having means for preventing side skidding of that type employing a member designed to enter the ground surface and supported at a point rearward of the planter, improved means whereby the member for entering the ground surface will not become clogged by loose trash and the like, or will not become broken by solid obstructions, such as stones, on the ground surface.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved device showing the manner in which it is connected to the frame member of a corn planter.

Figure 2 is a sectional view taken on the line 2—2 of Figure 1 and showing a portion of the corn planter in elevation.

Figure 3 is a detail sectional view taken on the line 3—3 of Figure 2.

Figure 4 is an enlarged, detail, sectional view taken on the line 4—4 of Figure 2.

Figure 5 is a detail sectional view taken on the line 5—5 of Figure 2.

The numeral 10 indicates the frame of a corn planter such as now in common use. The frame 10 is provided with a transversely arranged frame member 11 and also provided with a seat support 12 on which is mounted the seat 13.

My improved device comprises a supporting frame 14 which consists of a bar 15 designed to be placed adjacent to the back face of the member 11. Secured to each end of the bar 15 is a brace member 16 which extends rearwardly and inwardly, the inner ends of each of said bars 16 being provided with rearwardly extending portions 17. Secured to the rearwardly extending portions 17 is a downwardly extending guide member 18. Secured to the central portion of the bar 15 is a downwardly extending U-shaped bracket 19 in which is pivotally mounted a bar 20. The said bar 20 extends through the guide member 18 and has at its rear end a bifurcated portion 21.

Pivotally mounted in the rear ends of the members 21 is a rolling coulter 22. The members 21 are also provided with a shield 23 for said coulter. The forward end of the bar 20 is provided with a foot pedal 24 which provides means whereby the coulter 22 may be elevated above the ground surface. It is desirable, however, to apply pressure to the coulter 22, to cause it to enter the ground surface when the device is in operation. This I accomplish by providing a spring 25, one end of which is connected to the upper end of said support 12, while the other end of the spring 25 is pivotally connected to the forward end of the bar 20, as clearly illustrated in Figure 2, thereby providing means whereby yieldable and downward pressure will be applied to the coulter.

It is necessary to elevate the coulter above the ground surface when turning at the end of a row. It is also desirable to lock the said coulter in said elevated position when planting on level surfaces. This locking I accomplish by providing a bracket member 26 which is a part of the bracket 19, and pivoted to said bracket 26 is a pawl 27 having a notch 28 in its lower end designed to engage the upper edge of the forward end of the bar 20 when the coulter is in an elevated position, as shown by dotted lines in Figure 2, and to retain said coulter in the elevated position. A spring 29 is provided for yieldably retaining said pawl in its closed position. The upper end of the pawl 27 is provided with a foot pedal 30 arranged at right angles to the bar 27, and is retained normally in a substantially horizontal position, so that when the operator places his foot on said pedal and moves the free end of it downwardly, the lower end of the bar 27 will be moved outwardly, causing the notch 28 to disengage the bar 20, and thereby provide means whereby the coulter may be easily and quickly thrown into operative relation with the ground surface, by permitting the same to move downwardly by the action of gravity and the spring 25.

The supporting frame 14 is detachably connected with the bars 11 by suitable U-bolts 31, and so adjusted on said frame member 11 that the bar 20 and the coulter 22 will rest in a vertical plane extending through the longitudinal center of the corn planter, with the coulter 22 extending rearwardly therefrom a considerable distance.

Thus it will be seen that if the planter is being operated on a hillside parallel with the base of the inclination, the tendency of the rear end of the planter frame to move down hill will be eliminated to a large extent, due to the fact that the coulter 22 is caused to enter the ground surface a considerable distance from the planter, and provides means for preventing skidding of the planter.

Thus it will be seen that I have provided a planter attachment of simple, durable and inexpensive construction, which may be easily and quickly applied to a planter frame for the purpose of preventing skidding of the planter; and it will further be seen that I have provided in connection therewith means whereby the device may be easily and quickly thrown into and out of operation.

It will further be seen that by providing a rolling coulter for engaging the ground surface, I have provided means whereby the device will not clog up on account of loose trash, as the coulter will either cut or roll over the same. Further I have provided means whereby the device will not become broken if it encounters stones or other obstructions in the ground.

I claim as my invention:

1. In a device of the class described, a supporting frame, means for detachably securing one edge of said frame to a planter frame in transverse and fixed relation therewith, a bar pivotally connected to swing in a vertical and longitudinal plane, the swinging end of said bar extending outwardly from said supporting frame, a rolling coulter pivotally mounted in the free end of said bar, means carried by said supporting frame for elevating and lowering said coulter, means for yieldably holding said coulter in engagement with the ground surface, means for locking said coulter in its elevated position, and means for releasing said locking means.

2. In combination with a corn planter frame, a bar pivotally mounted to swing in a vertical plane extending longitudinally through said planter frame, the swinging end of said bar extending rearwardly from said planter frame, a rolling coulter pivotally mounted in the free end of said bar, means for elevating and lowering said coulter, means for locking said coulter in its elevated position, and means for releasing said locking means.

3. In combination with a corn planter frame, a bar pivotally mounted to swing in a vertical plane extending longitudinally through said planter frame, the swinging end of said bar extending rearwardly from said planter frame, a rolling coulter pivotally mounted in the free end of said bar, means for elevating and lowering said coulter, means for yieldably holding said coulter in engagement with the ground surface, and means for locking said coulter in its elevated position.

4. In combination with a corn planter frame, a bar pivotally mounted to swing in a vertical plane extending longitudinally through said planter frame, the swinging end of said bar extending rearwardly from said planter frame, a rolling coulter pivotally mounted in the free end of said bar, means for elevating and lowering said coulter, means for yieldably holding said coulter in engagement with the ground surface, means for locking said coulter in its elevated position, and means for releasing said locking means.

5. In a device of the class described, a triangular supporting frame, means for detachably securing one edge of said triangular frame adjacent to a planter frame in fixed relation therewith with the apex end of said frame projecting rearwardly, a guide member depending from the apex end of said frame, a bracket member depending from the central portion of the frame member lying adjacent to the planter frame, a bar pivotally mounted in said bracket member, a rolling coulter rotatively mounted in the outer end of said bar, a foot pedal on the inner end of said bar, a spring operatively connected to the inner end of said bar, and a ratchet device pivotally connected to said bracket and designed to engage said bar and retain the coulter in an elevated position.

JOHN C. PLUM.